(12) United States Patent
Fortmann et al.

(10) Patent No.: US 11,413,857 B2
(45) Date of Patent: Aug. 16, 2022

(54) BEARING ASSEMBLY FOR SUPPORTING A PRINTING CYLINDER OR AN ANILOX ROLL IN A PRINTING MACHINE AND PRINTING MACHINE

(71) Applicant: Bobst Bielefeld GmbH, Bielefeld (DE)

(72) Inventors: Jorg Fortmann, Herford (DE); Alexander Sudermann, Schloss Holte-Stukenbrock (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 17/326,118

(22) Filed: May 20, 2021

(65) Prior Publication Data

US 2021/0370663 A1 Dec. 2, 2021

(30) Foreign Application Priority Data

May 26, 2020 (EP) .................................... 20020248

(51) Int. Cl.
*B41F 3/54* (2006.01)
*B41F 5/24* (2006.01)

(52) U.S. Cl.
CPC . *B41F 3/54* (2013.01); *B41F 5/24* (2013.01)

(58) Field of Classification Search
CPC ...................................................... B41F 3/54
USPC .......................................................... 101/213
See application file for complete search history.

(56) References Cited

U.S. PATENT DOCUMENTS

| | | | |
|---|---|---|---|
| 3,708,215 A * | 1/1973 | Wilcock | F16C 33/106 384/102 |
| 3,750,497 A | 8/1973 | Goeke et al. | |
| 3,863,996 A | 2/1975 | Raimondi | |
| 4,641,978 A * | 2/1987 | Kapich | F01D 25/16 310/90.5 |
| 4,896,600 A * | 1/1990 | Rogge | B41F 5/24 101/182 |
| 6,761,112 B2 * | 7/2004 | Faist | B41F 13/24 101/247 |
| 7,900,559 B2 * | 3/2011 | Rasch | B41F 13/26 101/247 |
| 8,875,630 B2 * | 11/2014 | Izume | B41F 13/22 101/480 |
| 2009/0020028 A1 | 1/2009 | Christel et al. | |
| 2009/0145315 A1 * | 6/2009 | Schafer | B41F 13/30 101/217 |

(Continued)

*Primary Examiner* — Jennifer Bahls
(74) *Attorney, Agent, or Firm* — Bookoff McAndrews, PLLC

(57) ABSTRACT

A bearing assembly (26) is described. It is suitable for supporting a printing cylinder or an anilox roll in a printing machine and comprises at least one roller bearing (28, 30) being configured for receiving a shaft (12*b*, 14*b*, 16*b*) associated with the printing cylinder or the anilox roll. Additionally, it has a first support part (32) carrying the roller bearing (28, 30) and a second support part (34) being a carrier element of the printing machine or being configured for being mounted to a carrier element of the printing machine. Furthermore, a fluid chamber (36) is provided acting between the roller bearing (28, 30) and the second support part (34). Moreover, a printing machine is presented wherein a shaft (12*b*, 14*b*, 16*b*) associated with a printing cylinder or an anilox roll thereof is supported by such a bearing assembly (26).

20 Claims, 1 Drawing Sheet

(56) References Cited

U.S. PATENT DOCUMENTS

Figure 1:
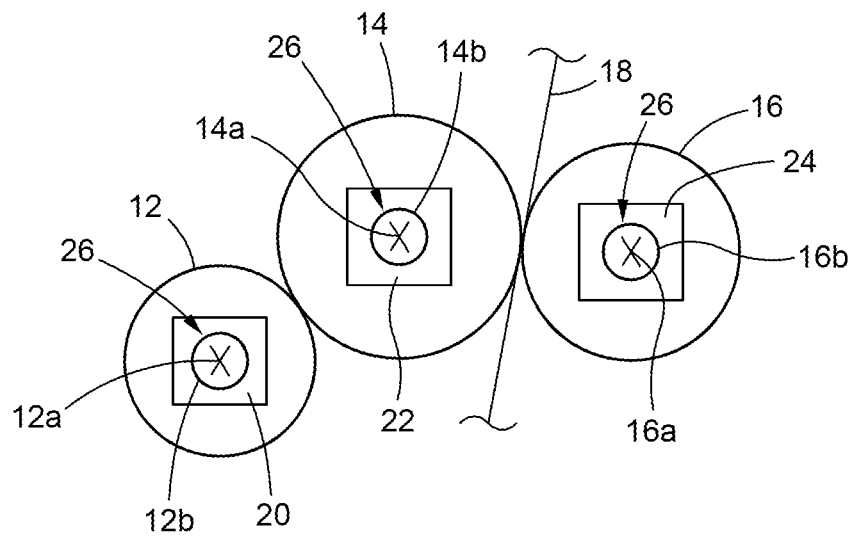

| | | | |
|---|---|---|---|
| 2015/0290927 A1* | 10/2015 | Franz | B41F 31/14 101/348 |
| 2016/0121598 A1* | 5/2016 | Zhou | B41F 3/54 101/216 |
| 2019/0337286 A1* | 11/2019 | Zeman | B41F 13/38 |

* cited by examiner

BEARING ASSEMBLY FOR SUPPORTING A PRINTING CYLINDER OR AN ANILOX ROLL IN A PRINTING MACHINE AND PRINTING MACHINE

CROSS-REFERENCE TO RELATED APPLICATION(S)

This application claims the benefit of priority under 35 U.S.C. § 119 from European Patent Application No. 20020248.9, filed on May 26, 2020, the contents of which is incorporated by reference in its entirety.

The invention relates to a bearing assembly for supporting a printing cylinder or an anilox roll in a printing machine, comprising at least one roller bearing being configured for receiving a shaft associated with the printing cylinder or the anilox roll.

Additionally, the invention relates to a printing machine comprising a printing cylinder and/or an anilox roll, wherein a shaft associated with the printing cylinder or the anilox roll is supported in the printing machine by such a bearing assembly.

In this context, a shaft associated with a printing cylinder or an anilox roll may be a shaft which is directly or indirectly connected with the printing cylinder or the anilox roll respectively. An indirect connection may comprise a gearing or drive mechanism.

Most printing processes cause vibrations which are generally undesirable. These vibrations need to be absorbed at least partially by the bearing assembly in order to allow for a high quality printing result. Therefore, it is known to use bearing assemblies with reduced play and/or bearing assemblies comprising a plurality of rows of rolling elements, e.g. three-row roller bearings.

It is an object of the present invention to further improve bearing assemblies of the type mentioned above. Especially, their capability of dampening or reducing vibrations shall be enhanced.

The problem is solved by a bearing assembly of the type mentioned above, which comprises a first support part carrying the at least one roller bearing, a second support part being a carrier element of the printing machine or being configured for being mounted to a carrier element of the printing machine, and a fluid chamber acting between the at least one roller bearing and the second support part. Such a bearing assembly allows for a precise support of the shaft associated with the printing cylinder or the anilox roll. To this end the roller bearing is fixedly and precisely supported in the first support part. With the second support part a well-defined and precise position of the bearing assembly within the printing machine is guaranteed. Additionally, the fluid chamber acts as a dampening chamber and thus the bearing assembly is able to absorb vibrations resulting from the printing process within a large frequency band.

The printing cylinder being supported by the bearing assembly is preferably a plate cylinder or an impression cylinder. In particular, such cylinders are used in flexographic printing machines.

The fluid chamber may be filled with a fluid, especially wherein the fluid is pressurized. In other words, the fluid within the fluid chamber forms a fluid cushion dampening vibrations. This is structurally simple and highly effective at the same time. The dampening properties may be adjusted by using different fluids and different levels of pressurization.

In a preferred embodiment the fluid chamber is substantially ring shaped. Thus, the fluid chamber circumferentially surrounds the shaft associated with the printing cylinder or the anilox roll and the roller bearings. Consequently, the dampening properties of the fluid chamber are independent from a rotatory position of the shaft. Overall, this leads to effective vibration dampening.

The first support part can be a bearing sleeve. Thus, the first support part is substantially tube shaped, carrying the roller bearing at its inner circumference. Such a part may be manufactured with standard machinery. Consequently, it may be produced in a cost-effective manner. Additionally, such a first support part is compact and therefore does not occupy a lot of space within the printing machine.

Alternatively or additionally the second support part is a bearing sleeve being configured for being mounted to the carrier element of the printing machine. Thus, the second support part is substantially tube shaped, wherein it is mounted to the carrier element of the printing machine at its outer circumference. The second support part receives the first support part and the roller bearing in its interior. Furthermore, the same effects and advantages which have already been explained with respect to the first support part being a bearing sleeve apply to the second support part mutatis mutandis.

According to a variant the fluid chamber is at least partially arranged in the first support part and/or the second support part. In principle, the location of the fluid chamber may be freely chosen as long as it is arranged between the roller bearing and the interface of the second support part to the printing machine. Thus, several alternatives are possible. For example, the fluid chamber is fully integrated in the first support part or the second support part. It is also possible that the fluid chamber is partially formed by the first support part and partially formed by the second support part. Thus, the exact arrangement of the fluid chamber can be chosen in function of the specific case of application and possible restriction related thereto.

Preferably, the first support part is rotationally fixed with respect to the second support part. Consequently, the walls of the fluid chamber are not movable with respect to each other. Thus, the fluid chamber only serves for dampening vibrations and does not fulfill the functionality of a hydrostatic bearing. Consequently, the fluid chamber may be specifically adapted for dampening.

The first support part and the second support part can be formed by a single part. This means that one single part fulfills the functions of the first support part and the second support part. Consequently, the fluid chamber is integrated in this single part. Since such a bearing assembly only comprises very few parts, it is structurally simple and particularly compact.

A first fluid connection may be provided being fluidically connected to the fluid chamber. This fluid connection may be used for supplying fluid to the fluid chamber and/or discharging fluid from the fluid chamber. Additionally, it may be used for pressurizing fluid inside the fluid chamber. Such a fluid connection may be positioned on the first support part or on the second support part depending on the specific arrangement of the fluid chamber. The fluid connection additionally makes it possible to easily replace the fluid inside the fluid chamber.

Additionally, a second fluid connection may be provided being fluidically connected to the fluid chamber, especially wherein the second fluid connection is separate from the first fluid connection. Also the second fluid connection may be used for supplying fluid to the fluid chamber and/or discharging fluid from the fluid chamber. If first and second fluid connections are provided, a fluid flow can be established inside the fluid chamber, i.e. pressurized or non-pressurized fluid may flow through the fluid chamber. In this configuration the fluid may also serve for cooling the bearing assembly. The second fluid connection may be positioned on the first support part or on the second support part depending on the configuration of the fluid chamber.

The bearing assembly may comprise a supplementary roller bearing being configured for receiving the shaft associated with the printing cylinder or the anilox roll, wherein the supplementary roller bearing and the roller bearing are arranged coaxially. Consequently, one end of the shaft is supported by a total of two roller bearings, i.e. at least two rows of rolling elements. Consequently, the shaft is supported in a particularly precise and mechanically stable manner.

Advantageously, the first support part carries the supplementary roller bearing. Thus, the first support part carries both the roller bearing and the supplementary roller bearing. This configuration is simple and compact.

According to a preferred embodiment, the fluid chamber extends over the roller bearing and the supplementary roller bearing. This allows for effective and reliable vibration dampening.

Furthermore, the problem is solved by a printing machine of the type mentioned above, wherein at least one shaft associated with the printing cylinder or the anilox roll is supported in the printing machine by a bearing assembly according to the invention. In such a printing machine vibrations resulting from the printing process are effectively and efficiently dampened.

The printing machine is preferably a flexographic printing machine. Such a printing machine may comprise two printing cylinders, wherein a first printing cylinder may be a plate cylinder and a second printing cylinder may be an impression cylinder.

Depending on the configuration of the printing machine a shaft associated with the plate cylinder and/or a shaft associated with the impression cylinder are/is supported by a bearing assembly according to the invention.

The invention will now be described with reference to the enclosed drawings. In the drawings, a. schematically shows a printing machine according to the invention, and b. shows a bearing assembly according to the invention.

Figure 2:
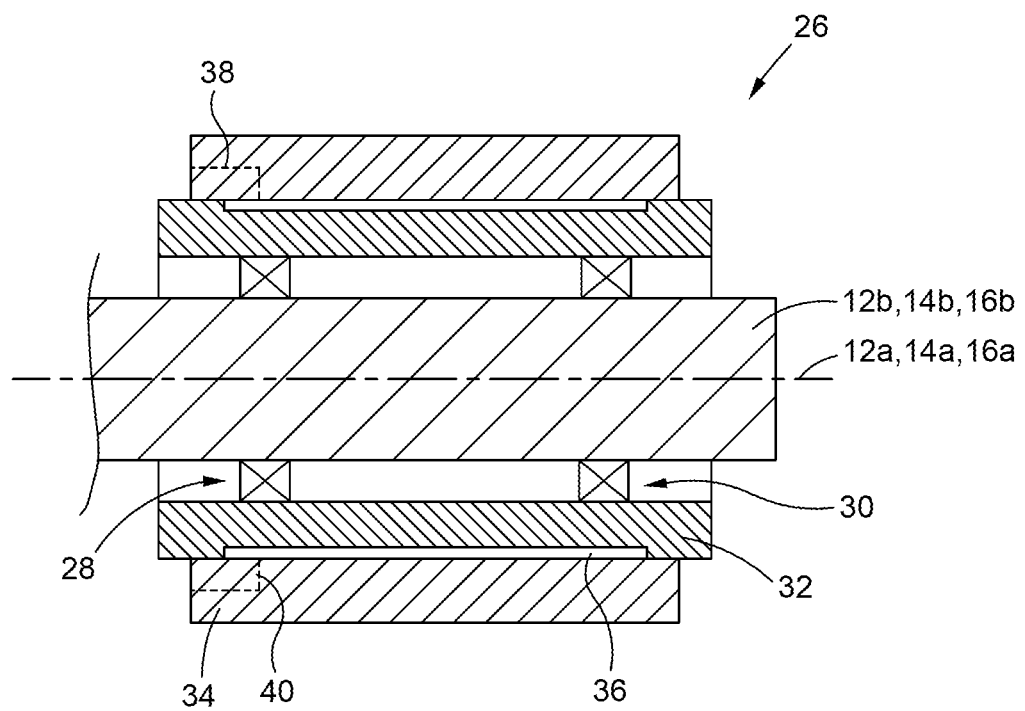

FIG. 1 discloses a printing machine 10 which is a flexographic printing machine in the example shown. FIG. 2 discloses a bearing assembly 26 of the printing machine 10.

It comprises an anilox roll 12, a first printing cylinder 14 which may also be called a plate cylinder, and a second printing cylinder 16 which may also be called an impression cylinder.

The printing machine 10 is configured for printing on a substrate 18 by using a known flexographic printing process according to which the anilox roll 12 transfers ink from an ink reservoir (not shown) to the first printing cylinder 14. The first printing cylinder applies the ink to the substrate 18 which is supported by the second printing cylinder 16.

The anilox roll 12 is rotatable about a rotational axis 12a and comprises a shaft 12b, which is rotationally supported in a carrier element 20 of the printing machine 10.

The first printing cylinder 14 is rotatable about a rotational axis 14a and has a shaft 14b being rotationally supported in a further carrier element 22 of the printing machine 10.

Also the second printing cylinder 16 is rotatable about a rotational axis 16a and has a shaft 16b which is rotationally supported in an additional carrier element 24 of the printing machine 10.

In the example shown all carrier elements 20, 22, 24 are connected to a frame of the printing machine 10 or are parts of this frame.

At least one of the shafts 12b, 14b, 16b is supported in the printing machine 10 by a bearing assembly 26 as shown in FIG. 2. More precisely, at least one end of at least one of the anilox roll 12, the first printing cylinder 14 and the second printing cylinder 16 is supported in the printing machine 10 by a bearing assembly 26.

In the example shown in FIG. 1, all of the shafts 12b, 14b, 16b are supported in the printing machine 10 by a bearing assembly 26 as shown in FIG. 2.

The bearing assembly 26 comprises a total of two roller bearings 28, 30 which are configured for receiving the respective shaft 12b, 14b, 16b.

The roller bearings 28, 30 are arranged coaxially.

Both roller bearings 28, 30 are held in a first support part 32 which is formed as a bearing sleeve.

Additionally, a second support part 34 is provided, which is also formed as a bearing sleeve.

The second support part 34 is rotationally fixed with respect to the first support part 32.

A fluid chamber 36 acts between the roller bearings 28, 30 and the second support part 34 for dampening vibrations resulting from a printing process.

The fluid chamber 36 is substantially ring shaped and thus circumferentially surrounds the respective shaft 12b, 14b, 16b, the bearings 28, 30 and at least a part of the first support part 32.

In a direction along the respective rotational axis 12a, 14a, 16a the fluid chamber 36 extends over both roller bearings 28, 30.

In the example shown the fluid chamber 36 is arranged at an outer circumference of the first support part 32 and is delimited by the second support part 34. In other words, the fluid chamber 36 is formed partially by the first support part 32 and partially by the second support part 34.

Of course, the portions of the fluid chamber 36 being formed by the first support part 32 and the second support part 34 may be varied.

It is also possible to arrange the fluid chamber 36 fully inside the first support part 32 or the second support part 34.

The bearing assembly 26 may be configured according to different alternatives.

In a first alternative which is shown in the Figures, the second support part 34 is separate from the respective carrier element 20, 22, 24. In this context, the second support part 34 is configured for being mounted to the respective carrier element 20, 22, 24.

In a second alternative, the second support part 34 is formed as the respective carrier element 20, 22, 24 of the printing machine 10.

In a third alternative, the first support part 32 and the second support part 34 are formed as a single part. This single part is of course separate from the respective carrier element 20, 22, 24. In this alternative, the fluid chamber 36 is fully integrated into the single part.

In all alternatives, a first fluid connection 38 and a second fluid connection 40 are provided being separate from one another and both being fluidically connected to the fluid chamber 36. The fluid connections 38, 40 may be used for supplying fluid to the fluid chamber 36 and/or discharging fluid therefrom.

By way of example, both fluid connections 38, 40 are arranged in the second support part 34. It is clear that the fluid connections 38, 40 may as well be arranged in any other location being suitable for supplying and/or discharging fluid from the fluid chamber 36.

In a first preferred example, the fluid chamber 36 is filled with pressurized fluid. This implies that during operation of the printing machine 10 the fluid connections 38, 40 are closed, e.g. by respective valves.

In a second preferred example, a flow of pressurized fluid is provided in the fluid chamber 36. Then, the first fluid connection 38 may serve as a fluid inlet supplying pressurized fluid to the fluid chamber 36 and the second fluid connection 40 may be used as a fluid outlet for discharging fluid from the fluid chamber 36 during operation of the printing machine 10. Of course also in this context valves may be used in order to control the flow of pressurized fluid.

In both alternatives the fluid forms a fluid cushion which dampens vibrations resulting from the printing process.

In the second alternative, the fluid additionally may be used as a coolant for cooling the bearing assembly 26.

The invention claimed is:

1. A bearing assembly for supporting a printing cylinder or an anilox roll in a printing machine, the bearing assembly comprising:
   at least one roller bearing, the at least one roller bearing being configured for receiving a shaft associated with the printing cylinder or the anilox roll;
   a first support part, the first support part carrying the at least one roller bearing;
   a second support part, the second support part being a carrier element of the printing machine or being configured for mounting to the carrier element of the printing machine; and
   a fluid chamber, the fluid chamber acting between the first support part and the second support part,
   wherein the fluid chamber is provided to overlap with the at least one roller bearing in a radial direction of the shaft while the shaft is received in the at least one roller bearing.

2. The bearing assembly of claim 1, wherein the fluid chamber is filled with a fluid.

3. The bearing assembly of claim 1, wherein the fluid chamber is substantially ring shaped.

4. The bearing assembly of claim 1, wherein the first support part is a bearing sleeve.

5. The bearing assembly of claim 1, wherein the second support part is a bearing sleeve being configured for mounting to the carrier element of the printing machine.

6. The bearing assembly of claim 1, wherein the fluid chamber is at least partially arranged in the first support part and/or the second support part.

7. The bearing assembly of claim 1, wherein the first support part is rotationally fixed with respect to the second support part.

8. The bearing assembly of claim 1, wherein the first support part and the second support part are formed by a single part.

9. The bearing assembly of claim 1, further comprising: a first fluid connection, the first fluid connection being fluidically connected to the fluid chamber.

10. The bearing assembly of claim 9, further comprising: a second fluid connection, the second fluid connection being fluidically connected to the fluid chamber and separate from the first fluid connection.

11. The bearing assembly of claim 9, further comprising: a supplementary roller bearing, the supplementary roller bearing being configured for receiving the shaft associated with the printing cylinder or the anilox roll that is not received by the at least one roller bearing, wherein the supplementary roller bearing and the at least one roller bearing are arranged coaxially.

12. The bearing assembly of claim 11, wherein the first support part carries the supplementary roller bearing.

13. The bearing assembly of claim 11, wherein the fluid chamber extends over both of the at least one roller bearing and the supplementary roller bearing.

14. A printing machine comprising:
   a printing cylinder and/or an anilox roll; and
   at least one shaft associated with the printing cylinder or the anilox roll, wherein the at least one shaft is supported in the printing machine by a bearing assembly according to claim 1.

15. A bearing assembly for a printing machine, the bearing assembly comprising:
   at least one roller bearing provided to receive a shaft in an axis of rotation of the at least one roller bearing;
   a first support part provided radially outside of the at least one roller bearing and radially aligned with the at least one roller bearing to support the at least one roller bearing, wherein the first support part includes a radially outer surface having a dimension, relative to the axis of rotation, that varies to define a radially inner surface of a fluid chamber; and
   a second support part provided radially outside of the first support part and radially aligned with the first support part to support the first support part, wherein the second support part includes a radially inner surface to define a radially outer surface of the fluid chamber.

16. The bearing assembly of claim 15, wherein the at least one roller bearing includes a first roller bearing and a second roller bearing.

17. The bearing assembly of claim 16, wherein a length of the fluid chamber along the axis of rotation of the at least one roller bearing is greater than a length from a surface of the first roller bearing facing away from the second roller bearing to a surface of the second roller bearing facing away from the first roller bearing.

18. A bearing assembly for a printing machine, the bearing assembly comprising:
   at least one roller bearing provided to receive a shaft along an axis of rotation of the at least one roller bearing;
   a first support part provided radially outside the at least one roller bearing and radially aligned with the at least one roller bearing to support the at least one roller bearing, wherein the first support part includes a radially outer surface to define a radially inner surface of a fluid chamber; and
   a second support part provided radially outside the first support part, radially aligned with the first support part to support the first support part, and longitudinally fixed in position relative to the first support part, wherein the second support part includes a radially inner surface to define a radially outer surface of the fluid chamber.

19. The bearing assembly of claim 18, wherein a longitudinal length of the fluid chamber is less than a longitudinal length of the first support part and less than a longitudinal length of the second support part.

20. The bearing assembly of claim 18, further comprising:
   a first fluid connection fluidically connected to the fluid chamber; and a second fluid connection fluidically connected to the fluid chamber, and radially aligned with the first fluid connection, relative to the axis of rotation of the at least one roller bearing.

\* \* \* \* \*